(12) United States Patent
Zheng et al.

(10) Patent No.: US 7,072,624 B2
(45) Date of Patent: Jul. 4, 2006

(54) ENCLOSURE ASSEMBLY FOR PORTABLE ELECTRONIC DEVICE

(75) Inventors: Fei Zheng, Shenzhen (CN); Hunter Zhou, Shenzhen (CN)

(73) Assignee: FIH Co., Ltd., Shindian (TW)

( * ) Notice: Subject to any disclaimer, the term of this patent is extended or adjusted under 35 U.S.C. 154(b) by 597 days.

(21) Appl. No.: 10/301,414

(22) Filed: Nov. 21, 2002

(65) Prior Publication Data

US 2004/0203518 A1      Oct. 14, 2004

(30) Foreign Application Priority Data

Jun. 28, 2002   (TW) .............................. 91209771 U (51) Int. Cl.
*H04B 1/38*        (2006.01)

(52) U.S. Cl. .................. 455/90.3; 455/575.1; 361/814

(58) Field of Classification Search .............. 455/90.3, 455/575.8, 575.3, 575.1, 550.1, 344; 361/724, 361/814; 70/63
See application file for complete search history.

(56) References Cited

U.S. PATENT DOCUMENTS

| | | | | |
|---|---|---|---|---|
| 2,486,536 A | * | 11/1949 | Olson ........................ 455/344 |
| 5,531,082 A | * | 7/1996 | Wolk et al. ..................... 70/63 |
| 6,111,760 A | * | 8/2000 | Nixon ......................... 361/814 |
| 6,542,721 B1 | * | 4/2003 | Boesen ..................... 455/553.1 |

* cited by examiner

*Primary Examiner*—Doris H. To
*Assistant Examiner*—Lewis West
(74) *Attorney, Agent, or Firm*—Wei Te Chung (57) ABSTRACT

An enclosure assembly for a portable electronic device according to a preferred embodiment of the present invention includes a cover (1), a plurality of latching elements (2), and a housing (3). The cover has a plurality of hooks (124) at a lower end and a plurality of tabs (16) defining grooves (162) therein extending from sidewalls (14) thereof. Each latching element comprises a plurality of protrusions (24) and a detaching means (222). The housing has a plurality of slots (38) at its sides and projections (322) at its lower end. Each projection defines a notch (324). In assembly, each latching element is received in a slot of the housing, the protrusions engage with the tabs of the cover and the hooks of the cover are received in the notches of the housing. To disassemble, the consumer uses two pointed objects to push the detaching means of the latching elements towards the lower end of the housing, disengaging the protrusions from the tabs.

23 Claims, 7 Drawing Sheets

ENCLOSURE ASSEMBLY FOR PORTABLE ELECTRONIC DEVICE

BACKGROUND OF THE INVENTION

1. Field of the Invention

This invention generally relates to enclosure assemblies for portable electronic devices, and more particularly to an enclosure assembly for a portable electronic device which is easy to assemble and disassemble.

2. Prior Art

There are two widely used methods to assemble an enclosure assembly for a portable electronic device such as a mobile phone or a personal digital assistant (PDA). One way uses screws; the other way uses press-fit structures.

However, assembling and disassembling the enclosure is time-consuming when screws are used. The force imposed on every screw is not ensured to be uniform and stress can be produced within the materials of the enclosure.

An enclosure which uses a press-fit structure is easy to assemble. However, it is not as easy to disassemble the enclosure and generally requires the use of special tools. In addition, the enclosure is susceptible to being destroyed during disassembly. As a result, ordinary consumers seldom try to disassemble the enclosure, even if they want to change the style of the enclosure.

Figure 7:
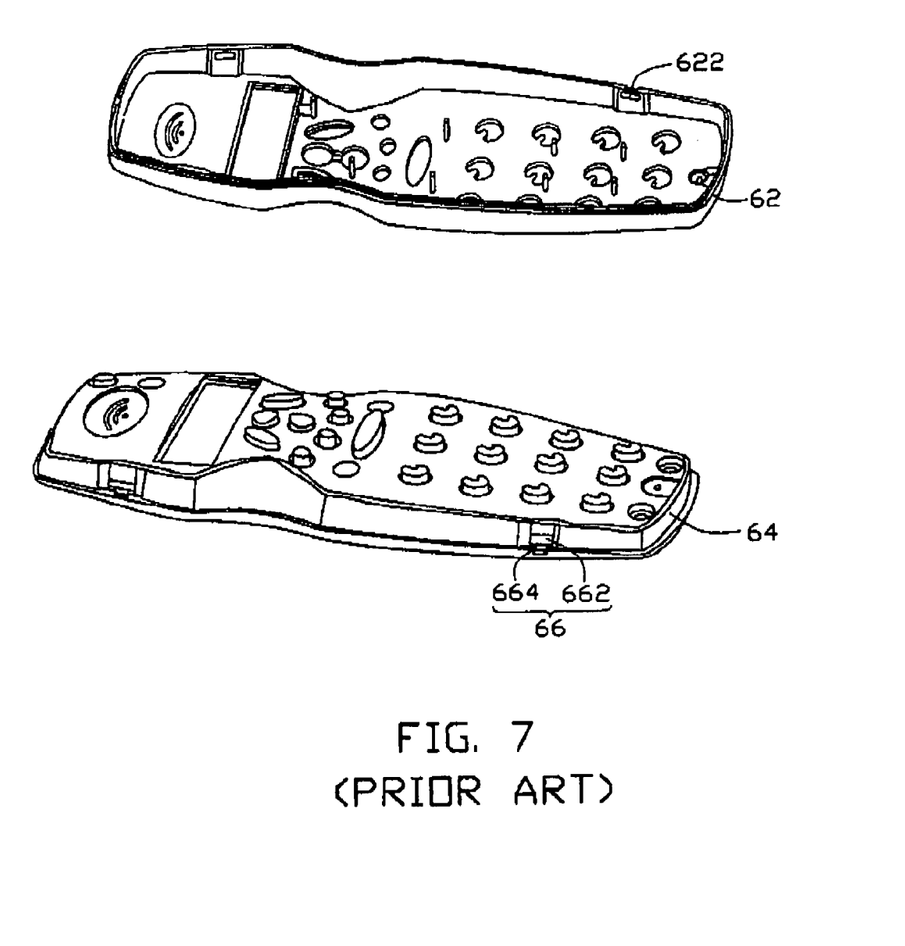
FIG. 7 is an exploded perspective view of an enclosure assembly for a portable electronic device of the prior art.

U.S. Pat. No. 6,347,218 discloses an improved structure of an enclosure for a portable electronic device (referring to FIG. 7). The enclosure comprises an external wall element 62 and a housing element 64. A plurality of notches 622 is defined in interior sidewalls (not labeled) of the external wall element 62, a plurality of attachment means 66 is provided on sidewalls of the housing element 64, corresponding in position to the notches 622. Each attachment means 66 comprises a catch projection 662 and an activation element 664 integrally formed therewith. When the enclosure is assembled, the external wall element 62 is pressed against the housing element 64, and the catch projections 662 catch in the notches 622. The external wall element 62 is thus secured to the housing element 64. To disassemble the enclosure, the activation elements 664 are pressed inwards and the projections 662 move inwardly together with the activation elements 664. The catch projections 662 then disengage from the notches 622, and the external wall element 62 is thus separated from the housing element 64. This enclosure structure prevents the enclosure from being destroyed during disassembly. However, a large amount of force has to be exerted against the activation elements 664 since the activation elements 664 are positioned below the projections 662, near the fulcrum of the attachment means 66. In addition, all the activation elements 664 must be pressed at the same time to disassemble the enclosure, which is difficult for some consumers to do.

SUMMARY OF THE INVENTION

Accordingly, an object of the present invention is to provide an enclosure assembly for a portable electronic device, which is easy to assemble and disassemble.

To achieve the above-mentioned object, an enclosure assembly for a portable electronic device according to a preferred embodiment of the present invention comprises a plurality of latching elements, a cover, and a housing. Each latching element has a body portion, a positioning end and a spring element connected therebetween. A plurality of protrusions extends from the body portion, and a detaching means is defined on the latching element. The cover has a top wall and two opposed sidewalls extending therefrom. A plurality of hooks extends from a lower end of the top wall and a plurality of tabs extends inwardly from the sidewalls, each tab defining a groove therethrough. The housing has a bottom wall with pairs of first and second sidewalls projecting upwardly therefrom. The first sidewalls extend from outer edges of the bottom wall. A plurality of projections extends from the lower end of the bottom wall, and a notch is defined in each projection to receive a hook of the cover. A slot, for receiving a latching element, is defined between every corresponding first and second sidewall, with the second sidewalls being closely positioned to the first sidewalls. In assembly, the protrusions of the latch element engage with the grooves of the cover and the hooks of the cover are received in the notches of the housing. The cover thus securely engages with the housing to form an enclosure assembly.

Other objects, advantages and novel features of the present invention will be drawn from the following detailed description of preferred embodiments of the present invention.

DETAILED DESCRIPTION OF THE INVENTION

Figure 1:
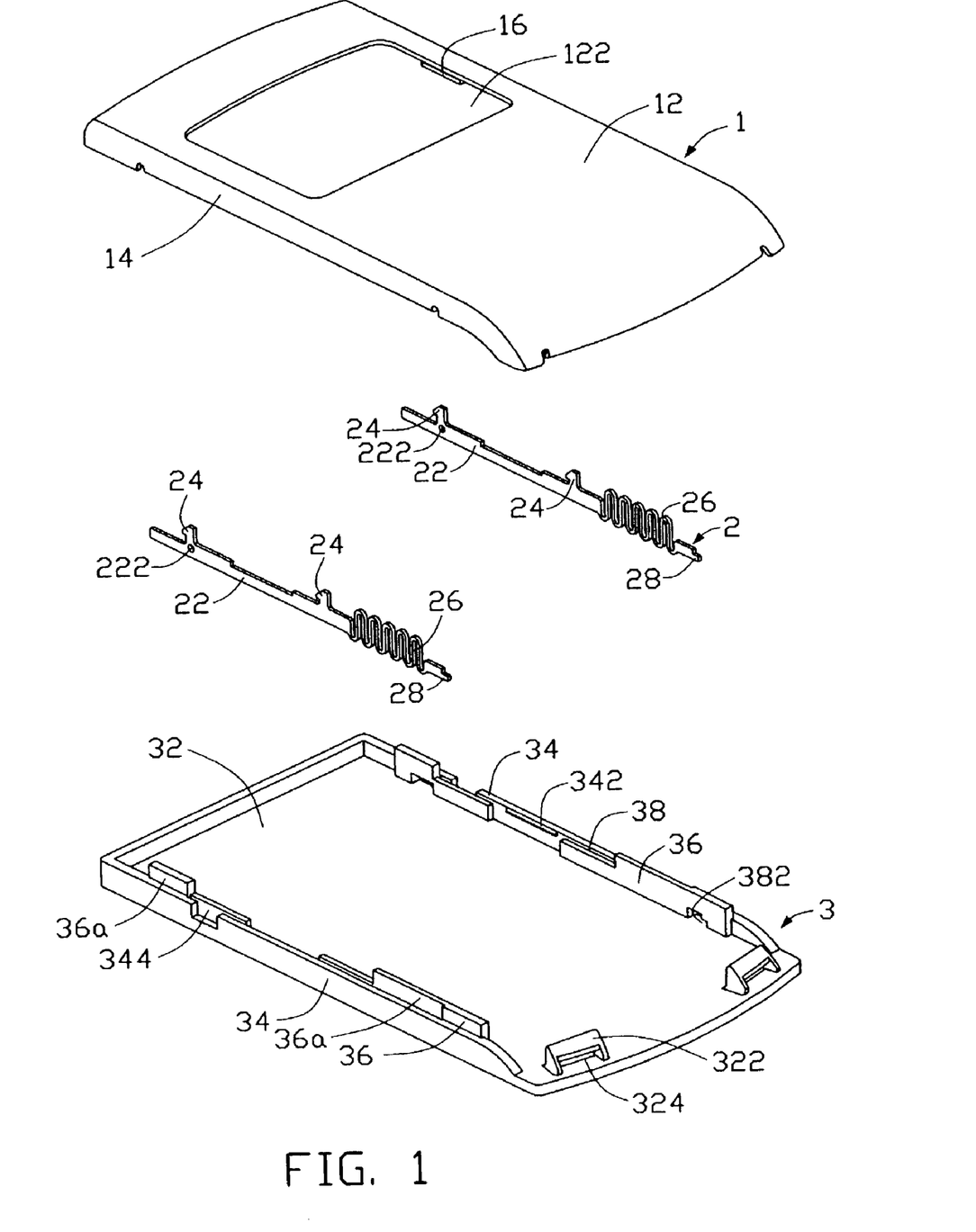
FIG. 1 is an exploded perspective view of an enclosure assembly for a portable electronic device according to a preferred embodiment of the invention.
Figure 2:
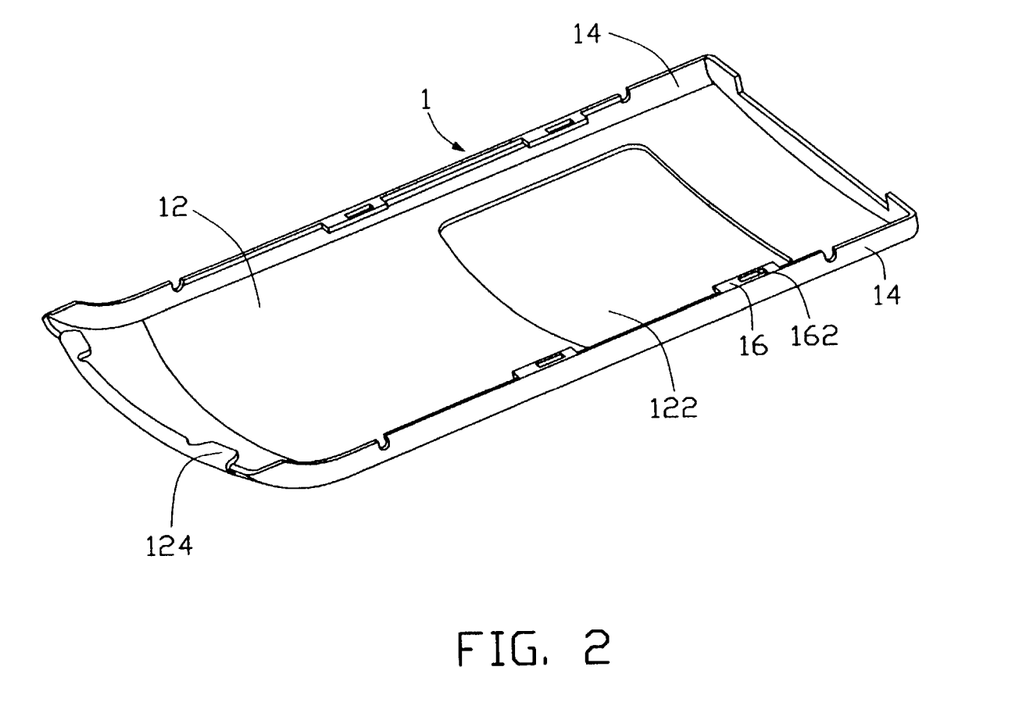
FIG. 2 is a perspective view of an underside of a cover of the enclosure assembly of FIG. 1.

Referring to FIG. 1 and FIG. 2, an enclosure assembly for a portable electronic device, for example, an upper enclosure of a folding cellular phone, will now be described in more detail according to a preferred embodiment of the present invention. The enclosure assembly comprises a cover 1, a plurality of latching elements 2, and a housing 3. In the following description, upper and lower ends of the cover 1 and housing 3 will be defined consistent with the enclosure assembly being an upper enclosure of a folding phone.

The cover 1 can be made of metal or plastic material. The cover 1 comprises a top wall 12, two opposite sidewalls 14 extending downwardly from two longitudinal edges of the top wall 12, a plurality of hooks 124 extending inwardly at a lower end of the cover 1, and a plurality of tabs 16 extending inwardly from bottom edges of the sidewalls 14. A groove 162 is defined in each tab 16. The cover 1 further comprises a window 122 defined through the top wall 12 to expose a display of the electronic device. The top wall 12 bends slightly downwardly at the lower end of the cover 1 to form a curved lower end portion.

Each latching element 2 is in the shape of a strip. Each latching element 2 comprises a body portion 22, a step-like positioning end 28, and a spring element 26 connected therebetween. A plurality of protrusions 24 extends upwardly from the body portion 22 along a direction perpendicular to a longitudinal axis thereof at intervals. The body portion 22 further comprises a detaching means 222 defined adjacent to one of the plurality of protrusions 24. The detaching means 222 is formed by defining a notch or a through-bore (not labeled) through the body portion 22, or can instead be formed by defining a protrusion extending from the body portion 22. The spring element 26 is arranged at an end of the body portion 22 to connect with the positioning end 28. The spring element 26 can be integrally formed with the body portion 22 and the positioning end 28 or connected therebetween in other forms.

The housing 3 comprises a pair of opposed first sidewalls 34 and a bottom wall 32 connecting therebetween. A pair of second sidewalls 36 extends upwardly from the bottom wall 32, each parallel to and opposite a corresponding first sidewall 34, and spaced from the first sidewall 34 by a slot 38. Each second sidewall 36 can be, in fact, composed of a series of wall segments with gaps therebetween, as shown in FIG. 1. Each wall segment of each second sidewall 36 has a section 36a which is higher than the first sidewalls 34. Each slot 38 is defined to receive a corresponding latching element 2 and a step-like receiving hole 382 at the bottom of the slot 38 is defined to receive the positioning end 28 of the latching element 2. The second sidewalls 36 and the bottom wall 32 define a space to accommodate a printed circuit board (not shown). A block element 342 is formed on an inner surface of each first sidewall 34 to retain a corresponding latching element 2 within the slot 38 and an opening 344 is defined through each first sidewall 34 adjacent to the block element 342 for exposing the detaching means 222 of the latching element 2. A plurality of projections 322 is formed at intervals at the lower end of the bottom wall 32. A notch 324 is defined between each projection 322 and the bottom wall 32 to engage with a corresponding hook 124 of the cover.

Figure 3:
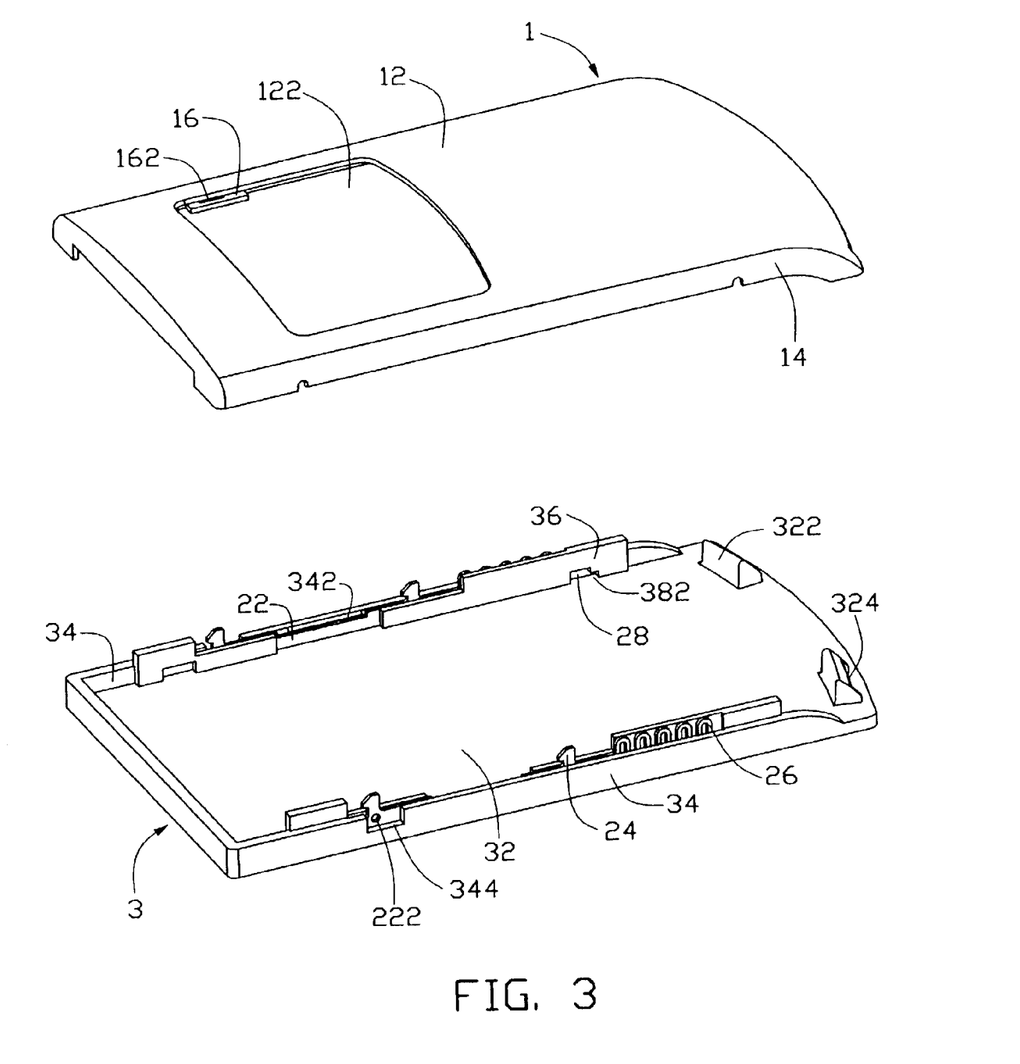
FIG. 3 is a perspective view of the enclosure assembly of FIG. 1, in which the pair of latching elements and the housing are joined together.
Figure 4:
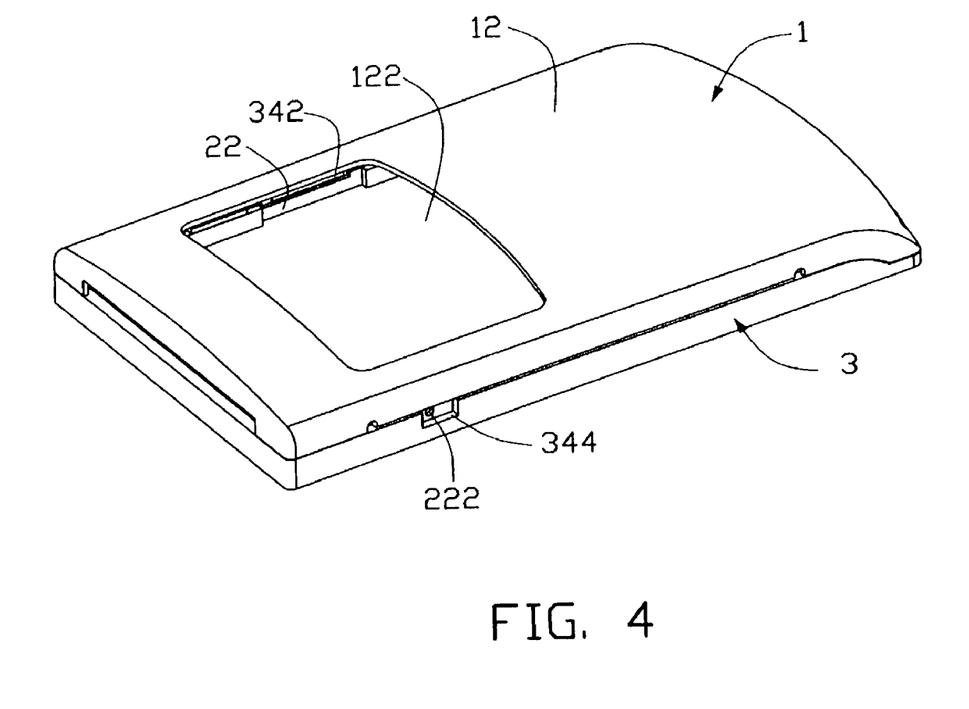
FIG. 4 is a perspective view of the assembled enclosure assembly of FIG. 1.

The enclosure assembly may be assembled as follows. Referring to FIG. 3, the positioning end 28 of each latching element 2 (FIG. 1) is aligned with a corresponding receiving hole 382 and is inserted into the receiving hole 382 with the protrusions 24 facing upward. The latching elements 2 are pressed down into the slots 38 and are secured therein by the block elements 342 of the housing 3. Each detaching means 222 will be visible through a corresponding opening 344. Next, the hooks 124 of the cover 1 are inserted into corresponding notches 324 of the housing 3. The cover 1 is then pressed downward towards the housing 3. The plurality of protrusions 24 of the latching element 2 snap into the plurality of grooves 162 of the cover 1. Thus the cover 1 is securely engaged with the housing 3, as shown in FIG. 4. Since the sections 36a of the wall segment of each second sidewall 36 are higher than each first sidewall 34, an engagement between the sections 36a and the tabs 16 of the cover 1 prevent the cover 1 from moving longitudinally along the first sidewall 34.

To disassemble the enclosure assembly, a pointed object is inserted through each opening 344 of the housing 3 into each detaching means 222. Each latching element 2 is then pushed, using the pointed object, toward the lower end of the enclosure assembly, compressing the spring element 26, until the protrusions 24 of the latching elements 2 unlatch from the tabs 16 of cover 1. The cover 1 is then moved in an arc toward the lower end of the housing 3 until the hooks 124 disengage from the notches 324. The enclosure assembly is thus disassembled.

Figure 5:
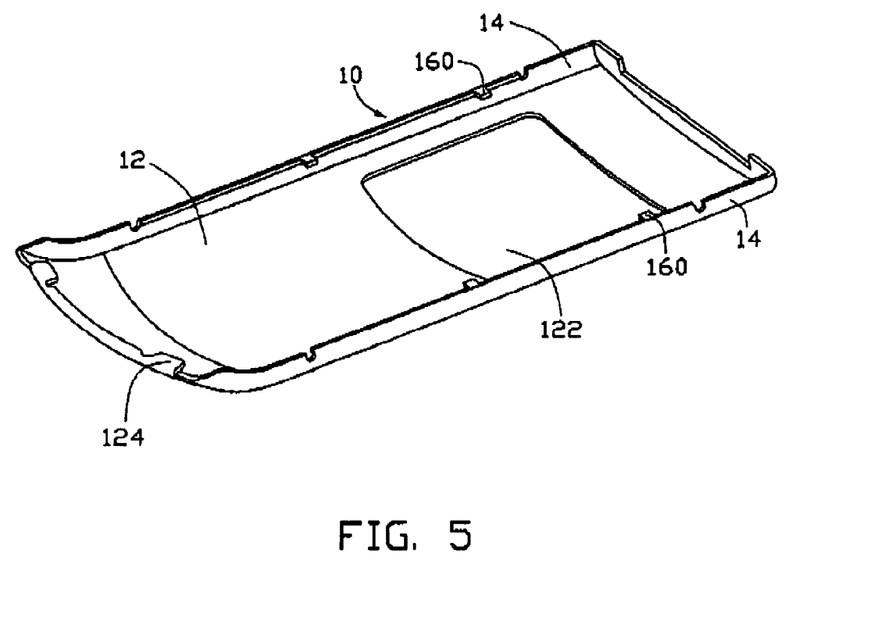
FIG. 5 is a perspective view of an underside of a cover of an enclosure assembly according to a second preferred embodiment of the present invention.

FIG. 5 is a perspective view of a cover 10 of an enclosure assembly according to a second preferred embodiment of the present invention, in which a plurality of tabs 160 without grooves is substituted for the plurality of tabs 16 with grooves 162. The cover 10 engages with the housing 3 of FIG. 1, with the tabs 160 locking with the protrusions 24 of the latching elements 2.

Figure 6:
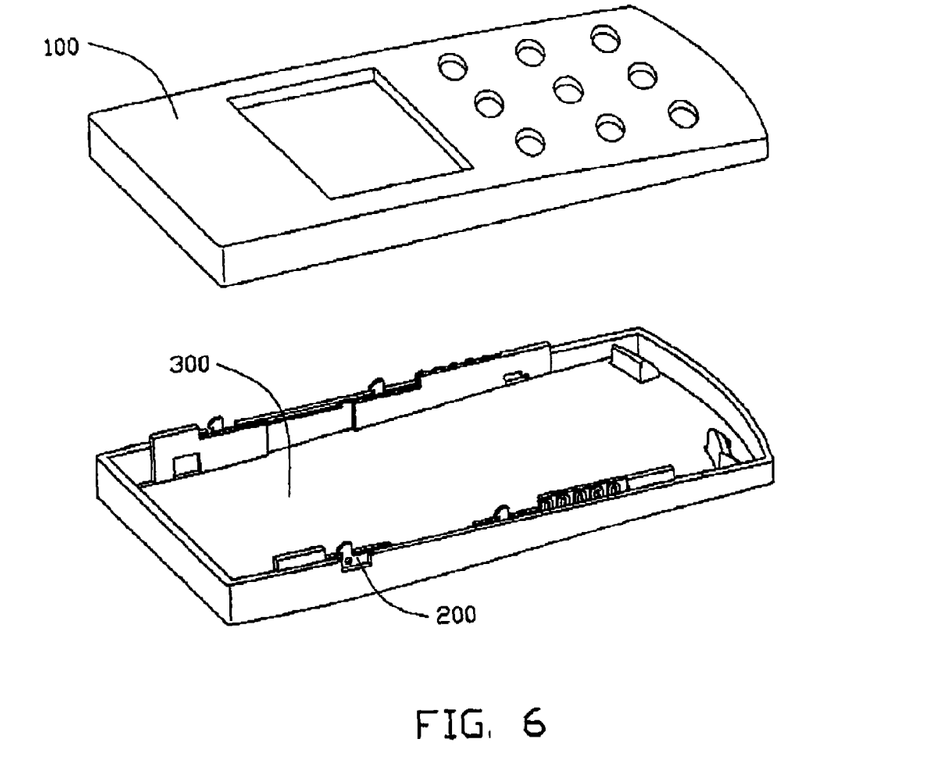
FIG. 6 is a perspective view of an enclosure assembly for an entire portable electronic device according to a third preferred embodiment of the invention.

FIG 6 shows an enclosure assembly for an entire portable electronic device according to a third preferred embodiment of the present invention. A cover 100, latching element 200, and housing 300 all have engaging elements similar or identical to those of the above mentioned enclosure assembly embodiments.

The enclosure assembly of the present invention is easy to assemble and disassemble, and requires only a small force against the latching elements, using ordinary tools, to disassemble the cover 1 from the housing 3. Therefore, it is convenient for consumers to change the enclosure of the portable electronic device without an expert's help or tools. Each component of the enclosure assembly has a simple structure and the enclosure assembly can be manufactured in a small size. The dimensions of the portable electronic device can therefore be minimized. There is no special requirement for the elasticity of the materials used in the cover 1 or housing 3 of the enclosure assembly, so the cost of manufacture is reduced.

It is believed that the present invention and its advantages will be understood from the foregoing description and it will be apparent that various changes may be made thereto without departing from the spirit and scope of the invention or sacrificing all of its material advantages, the examples hereinbefore described merely being preferred or exemplary embodiments of the invention.

We claim:

1. An enclosure assembly for a portable electronic device, comprising:

at least a latching element comprising a body portion, a positioning end and a spring element connected therebetween, a plurality of protrusions extending from the body portion, and a detaching means being defined on the latching element;

a cover, having a top wall, two opposed sidewalls extending therefrom, a plurality of hooks extending from a lower end of the top wall, a plurality of tabs extending from the sidewalls, each tab defining a groove therethrough to receive a protrusion of the latching element; and a housing, having a pair of opposed first sidewalls, a bottom wall connected therebetween, a pair of second sidewalls extending from the bottom wall, a plurality of projections extending from a lower end of the bottom wall, a notch being defined in each projection to receive a hook of the cover, each first sidewall and each second sidewall defining a slot therebetween for receiving a corresponding latching element;

the cover being securely engagable with the housing by engagement of hooks of the cover in the notches of the housing and the tabs of the cover with the protrusions of the latching elements.

2. The enclosure assembly of claim 1, wherein each first sidewall and its corresponding second sidewall cooperatively define a step-like receiving hole at a lower end of the second sidewall.

3. The enclosure assembly of claim 2, wherein each second sidewall is parallel and opposite a corresponding first sidewall.

4. The enclosure assembly of claim 3, wherein each second sidewall is composed of a series of wall segments with gaps therebetween.

5. The enclosure assembly of claim 4, wherein each wall segment has a section, which is higher than the first sidewall.

6. The enclosure assembly of claim 5, wherein an opening is defined in each of the first sidewalls for exposing the detaching means.

7. The enclosure assembly of claim 6, wherein at least a block element is formed on an inner surface of each first sidewall for retaining the latching element within the slot.

8. The enclosure assembly of claim 7, wherein the detaching means is formed by defining a notch in the latching element.

9. The enclosure assembly of claim 7, wherein the detaching means is formed by defining a through-bore in the latching element.

10. The enclosure assembly of claim 7, wherein the detaching means is formed by forming a protrusion on the latching element.

11. The enclosure assembly of claim 1, wherein the at least a latching element is in the shape of a strip and the spring element is integrally formed with the body portion and the positioning end.

12. The enclosure assembly of claim 11, wherein the plurality of protrusions of the at least a latching element extends upward from the body portion along a direction perpendicular to a longitudinal axis of the body portion.

13. The enclosure assembly of claim 1, wherein a window is defined through the top wall of the cover to expose a display of the portable electronic device.

14. An enclosure assembly for a portable electronic device, comprising:
   a plurality of latching elements each having a plurality of protrusions extending therefrom and a detaching means;
   a cover, having a top wall, two opposed sidewalls extending therefrom, a plurality of hooks extending from a lower end of the top wall, a plurality of tabs extending from the sidewalls to engage with the plurality of protrusions; and
   a housing, having a pair of opposed first sidewalls, a bottom wall connected therebetween, a pair of second sidewalls extending from the bottom wall, a plurality of projections extending from a lower end of the bottom wall, a notch being defined in each projection to receive a hook of the cover, each first sidewall and each second sidewall defining a slot therebetween for receiving a corresponding latching element;
      the cover being thus securely engagable with the housing by engagement of hooks of the cover in the notches of the housing and the tabs of the cover with the protrusions of the latching elements.

15. The enclosure assembly of claim 14, wherein an opening is defined on each of the first sidewalls for exposing the detaching means.

16. The enclosure assembly of claim 15, wherein at least a block element is formed on an inner surface of each first sidewall for retaining the latching element within the slot.

17. The enclosure assembly of claim 14, wherein the latching element further comprises a body portion, a positioning end and a spring element connected therebetween.

18. The enclosure assembly of claim 17, wherein the spring element is integrally formed with the body portion and the positioning end.

19. An enclosure assembly for a portable electronic device, comprising:
   a plurality of latching elements each having a plurality of protrusions extending therefrom and a detaching means;
   a cover, having a top wall, two opposed sidewalls extending therefrom, a plurality of tabs extending from the sidewalls to engage with the plurality of protrusions; and
   a housing, having a pair of opposed first sidewalls, a bottom wall connected therebetween, and a pair of second sidewalls extending from the bottom wall, each first sidewall and each second sidewall defining a slot therebetween for receiving a corresponding latching element;
   the cover being thus securely engagable with the housing by engagement of the tabs of the cover with the protrusions of the latching elements.

20. The enclosure assembly of claim 19, wherein a plurality of books extends from a lower end of the top wall of the cover, a plurality of projections extends from a lower end of the bottom wall of the housing, and a notch is defined in each projection to receive a corresponding hook of the cover.

21. An enclosure assembly comprising;
   a housing and a cover fastened to each other to commonly define a space therein, the housing having a pair of opposed first sidewalls, a bottom wall connected therebetween, and at least one second sidewall extending from the bottom wall, with the second sidewall and at least one of the first sidewalls defining at least one slot therebetween; and
   at least one elongated latching element retainably received in the slot and thereby being mounted on the housing and extending along an elongated direction thereof, the latching element including a body portion extending along said elongated direction with at least one latching projection extending therefrom, a resilient section deformable along said elongated direction, and an actuation section accessible from an exterior in a direction perpendicular to said elongated direction.

22. The assembly of claim 21, wherein the latching element is disposed along a lengthwise edge area of said space.

23. The assembly or claim 21, wherein the latching element is fully embedded within exterior contours of the housing and the cover.

* * * * *